US007447480B2

(12) United States Patent
Rieder et al.

(10) Patent No.: US 7,447,480 B2
(45) Date of Patent: Nov. 4, 2008

(54) WIRELESS, ESPECIALLY MOBILE, COMMUNICATION DEVICE FOR COMMUNICATING WITH COMMUNICATION DEVICES IN VEHICLES

(75) Inventors: Helmut Rieder, Graz (AT); Raimund Pammer, Graz (AT)

(73) Assignee: EFKON AG, Graz (AT)

( * ) Notice: Subject to any disclaimer, the term of this patent is extended or adjusted under 35 U.S.C. 154(b) by 469 days.

(21) Appl. No.: 10/466,529

(22) PCT Filed: Jan. 9, 2002

(86) PCT No.: PCT/AT02/00002

§ 371 (c)(1),
(2), (4) Date: Jul. 17, 2003

(87) PCT Pub. No.: WO02/058012

PCT Pub. Date: Jul. 25, 2002

(65) Prior Publication Data

US 2004/0053651 A1 Mar. 18, 2004

(30) Foreign Application Priority Data

Jan. 17, 2001 (AT) ................................ A 77/2001

(51) Int. Cl.

*H04B 5/00* (2006.01)
*H04B 7/00* (2006.01)
*G08G 1/09* (2006.01)
*G08G 1/07* (2006.01)
*G08G 1/095* (2006.01)

(52) U.S. Cl. .................... 455/41.1; 455/41.2; 455/41.3; 340/905; 340/928; 340/907; 340/908; 340/933; 342/42; 342/44; 342/51

(58) Field of Classification Search ............ 455/41.1–3; 340/905, 928, 907, 908, 933; 342/42, 44, 342/51
See application file for complete search history.

(56) References Cited

U.S. PATENT DOCUMENTS 4,908,615 A * 3/1990 Bayraktaroglu ............. 340/933

(Continued)

FOREIGN PATENT DOCUMENTS

DE 19600802 7/1996

(Continued)

OTHER PUBLICATIONS

Blythe P T et al, *A Short-Range Road to Vehicle Microwave Communications Link for Automatic Debiting and Other RTI Services*: Advanced Telematics in Road Transport. Proceedings of the Drive Conference, Feb. 4-6, 1991, Brussels, BE, Amsterdam, NL, vol. 1, 1991, pp. 248-268, XP000443997.

(Continued)

*Primary Examiner*—Matthew Anderson
*Assistant Examiner*—Wen W Huang
(74) *Attorney, Agent, or Firm*—Collard & Roe, P.C.

(57) ABSTRACT

A wireless, in particular mobile, communication device (8) for communicating with communication units (9) in vehicles (5, 6, 7), comprising a transmitter (26) and a receiver (29) for information-containing electromagnetic waves, as well as a control unit (25) for controlling the transmitter (26), a directional characteristic (10, 10') being provided for the receiver (29) and/or for the transmitter (26), for a selective communication with communication units (9) in vehicles (5, 6, 7) at distances (D) of more than 10 m, preferably in the order of from 20 m to 200 m, e.g. in the order of approximately 100 m, in particular with a receiving angle, or a radiation angle, respectively, of from 0.5° to 4°, preferably 0.8° to 2.5°, and a sighting unit (13) as well as an indication unit (16, 18) being provided, the indication unit being connected with the receiver (29) via a processing unit.

24 Claims, 4 Drawing Sheets

U.S. PATENT DOCUMENTS

Figure 1:
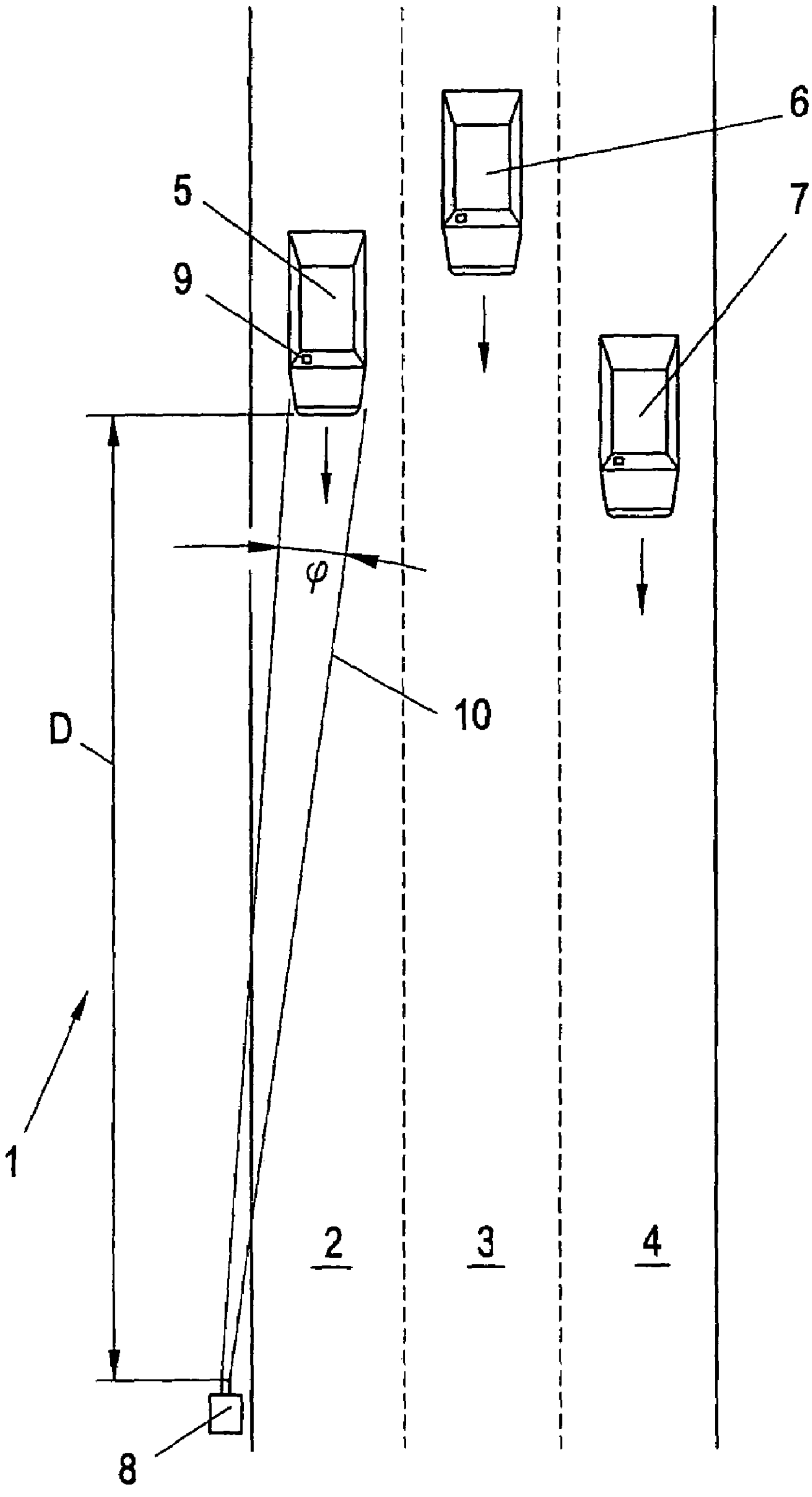

| | | | | | |
|---|---|---|---|---|---|
| 4,916,296 | A | * | 4/1990 | Streck | 340/904 |
| 5,144,553 | A | | 9/1992 | Harrison et al. | |
| 5,406,275 | A | * | 4/1995 | Hassett et al. | 455/517 |
| 5,485,520 | A | | 1/1996 | Chaum et al. | |
| 5,680,241 | A | * | 10/1997 | Sakanaka et al. | 398/118 |
| 5,701,127 | A | * | 12/1997 | Sharpe | 340/928 |
| 5,963,149 | A | | 10/1999 | Okada et al. | |
| 6,285,476 | B1 | * | 9/2001 | Carlson et al. | 398/9 |
| 6,609,655 | B1 | * | 8/2003 | Harrell | 705/13 |
| 6,725,202 | B1 | * | 4/2004 | Hurta et al. | 705/13 |
| 7,035,818 | B1 | * | 4/2006 | Bandy et al. | 705/28 |

FOREIGN PATENT DOCUMENTS

| | | |
|---|---|---|
| DE | 19544054 | 5/1997 |
| EP | 0613108 | 8/1994 |
| HU | HU 221 289 B1 | 8/1996 |
| HU | HU 218 127 B | 8/1998 |
| WO | WO9400830 | 1/1994 |
| WO | WO9933027 | 7/1999 |
| WO | WO9966455 | 12/1999 |

OTHER PUBLICATIONS

European Patent Office Report dated Aug. 29, 2006 w/English translation, 4 pages.

English translation of Hungarian Patent Office Search Report, dated Jul. 13, 2004, 2 pages.

* cited by examiner

WIRELESS, ESPECIALLY MOBILE, COMMUNICATION DEVICE FOR COMMUNICATING WITH COMMUNICATION DEVICES IN VEHICLES

CROSS REFERENCE TO RELATED APPLICATIONS

Applicants claim priority under 35 U.S.C. 119 of AUSTRIAN Application No. A 77/2001 filed on Jan. 17, 2001. Applicants also claim priority under 35 U.S.C. §365 of PCT/AT02/00002 filed on Jan. 9 2002. The international application under PCT article 21(2) was not published in English.

The invention relates to a wireless, in particular mobile, communication device for communicating with communication units in vehicles, comprising a transmitter and a receiver for electromagnetic waves containing information, as well as a control unit for controlling the transmitter.

Various devices have been suggested for the wireless communication with vehicles on roads, freeways, or also in parking places, depending on the objectives envisaged. Basically, the most varying conventional communication techniques are conceivable, such as GSM, UMTS, GPRS, DSRC etc. In particular, from WO 99/33027 so-called "virtual" toll stations are known which enter into a bi-directional communication with vehicles, or more precisely, with vehicle-borne communication devices, when this toll site is passed, so as to realize the payment of a toll by linking position information obtained, e.g., via GPS, with data stored in a device. Apart from the fact that locating the vehicles is comparatively unreliable, this involves an at least temporarily stationary toll site with a communication device, wherein, moreover, communication is only provided in a close range having a limited range of usually below 10 m. Furthermore, the communication devices are adapted such that they cover the total width of a roadway, wherein, in case of several lanes per roadway and, accordingly, of several vehicles moving in different lanes, a special technique is required to differentiate between the individual vehicles in the different lanes (the so-called "matching").

It would now be desirable to provide a selective, precisely targeting, in particular mobile communication device for wireless communication with selected vehicle-borne communication units (so-called OBUs—on board units) at arbitrary sites along roads or in parking places, so as to be able to carry out a check—e.g. on a toll road—comparable to a speed check with a mobile laser device, as to whether or not a toll transaction has been carried out for the respective vehicle, or whether or not a parking fee has been paid. In this case, it should be possible to provide the mobile communication device as a portable device, like a laser gun, optionally also as a vehicle-borne installation in a checking vehicle.

Accordingly, it is an object of the invention to provide a communication device for a precisely targeted data exchange with a moving or non-moving vehicle from arbitrary locations, from a person or from a vehicle, wherein a selective communication with the respective vehicle to be checked shall also be possible from larger distances.

Accordingly, the communication device of the initially mentioned type is characterized in that a directional characteristic is provided for the receiver and/or the transmitter, for a selective communication with communication devices in vehicles at distances in the order of from 20 m to 200 m, e.g. approximately 100 m, in particular with a receiving angle or angle of radiation of from 0.5° to 4°, preferably 0.8° to 2.5°, and in that a sighting unit as well as an indication unit is provided, the indication unit being connected to the receiver via a processing unit.

In the present communication device, there is provided a receiver and/or an active transmitter with a defined narrow receiving or radiation characteristic, respectively, which is adapted to select vehicles in the given distance range, e.g. 100 m or 150 m. The communication device may work in a per se conventional manner with radio waves, respective antennas with a narrow directional characteristic having to be provided. Preferred, however, is a communication in the optic range, in particular in the infrared range, in which case the light transmitter, or the light receiver, respectively, has an associated optics for achieving the narrow directional characteristic, i.e. beam focusing, or the reception restriction, respectively, so that a narrow focused light beam, or IR-beam, respectively, is achieved with this optics.

With the—optic—sighting unit, similar as with a portable laser device, the respective vehicle can be sighted, and within the given distance, e.g. 100 m, the sent out wave beam will reach exactly only this one vehicle, whereas other vehicles, e.g. in neighboring lanes, will not be covered (or will be blocked). In this manner, a selective communication in terms of the desired data exchange is possible in a simple manner. The data exchange will be used, e.g. for the purpose of checking—electronically—paid toll or parking fees, it being assumed that each of the vehicles has a so-called OBU unit installed therein. These vehicle-borne communication devices (OBUs) normally will be in a standby (dormant) state, and they are activated at the above-indicated check so as to transmit the desired data to the mobile communication device.

To indicate data or, generally, information on the course of the communication, e.g. if a connection with the vehicle cannot be made, it is advantageous if the indication unit has an optic display means, a display, in particular an LCD-display. Thereinstead or preferably, in addition thereto, also an acoustic indication means, e.g. a buzzer, may be provided, e.g. so as to allow for a corresponding acoustic indication for the operator by different buzzing sounds if a communication connection has been made or if a communication connection has failed to be made.

The data transmitted from the vehicle-borne communication unit and received by the communication device are processed in a per se conventional manner in a processing unit following the receiver, so as to allow for an indication of these data, and this processing unit may advantageously be formed by a processor which also can put the data into an appropriate format for the indication or also for a different output, as is conventional per se.

The object of the control unit associated to the transmitter is to cause the transmitter in the desired manner to send out the electromagnetic waves for making the desired communication, wherein this activation of the transmitter should occur as automatic as possible; for this purpose, it is advantageous if the control unit for the transmitter is formed by a processor, preferably by the same processor which forms the processing unit. It is of further advantage in this respect if the processor is provided with a memory for information to be transmitted and received, respectively. Moreover, it is also advantageous if the processor is connected to an input unit, in particular keys, to input information and instructions. As desired, e.g. depending on the site where the mobile communication unit has been set up and depending on the type of inquiry, specific information, or inquiring data, respectively, can be prepared in this manner which then will be sent out in case a check is made. For this purpose, e.g., also the next freeway toll site associated with the site of set up can be identified by data.

As has already been mentioned, transmission, i.e. the sending out of the inquiring information, should largely be automatic, wherein, however, a purposeful triggering of the transmission procedure—e.g. when a vehicle approaches—shall be possible, and accordingly, it is advantageous if the control unit for the transmitter has an associated trigger-like switch for triggering the transmitter for delivering electromagnetic waves.

For the automatic transmission procedure it is advantageous if the control unit for the transmitter, optionally the processor, has an associated memory for pre-determined transmission signal informations, with a wake-up signal for the vehicle communication unit and with command signals for the vehicle communication unit so as to cause the latter to identify and deliver stored information, in particular status information and information regarding toll transactions.

For a check, optionally for a documentation, it is also suitable if a date and time indication fed by a clock signal generator of the processor is provided. In case a check is made, the data received by the vehicle-borne communication unit can then be stored together with the data regarding date and time and, e.g., can be printed as a protocol by means of a printer contained in the portable device or by an external printer. It is, of course, also conceivable to store at first the received data together with the data regarding the time in a memory, and to output them later via an external printer, optionally after connection to a PC with a printer.

To be able to keep the data regarding the respective next toll site associated to the checking site for a longer period of time, the communication device suitably is provided with a memory for storing a toll site identification.

Figure 2:
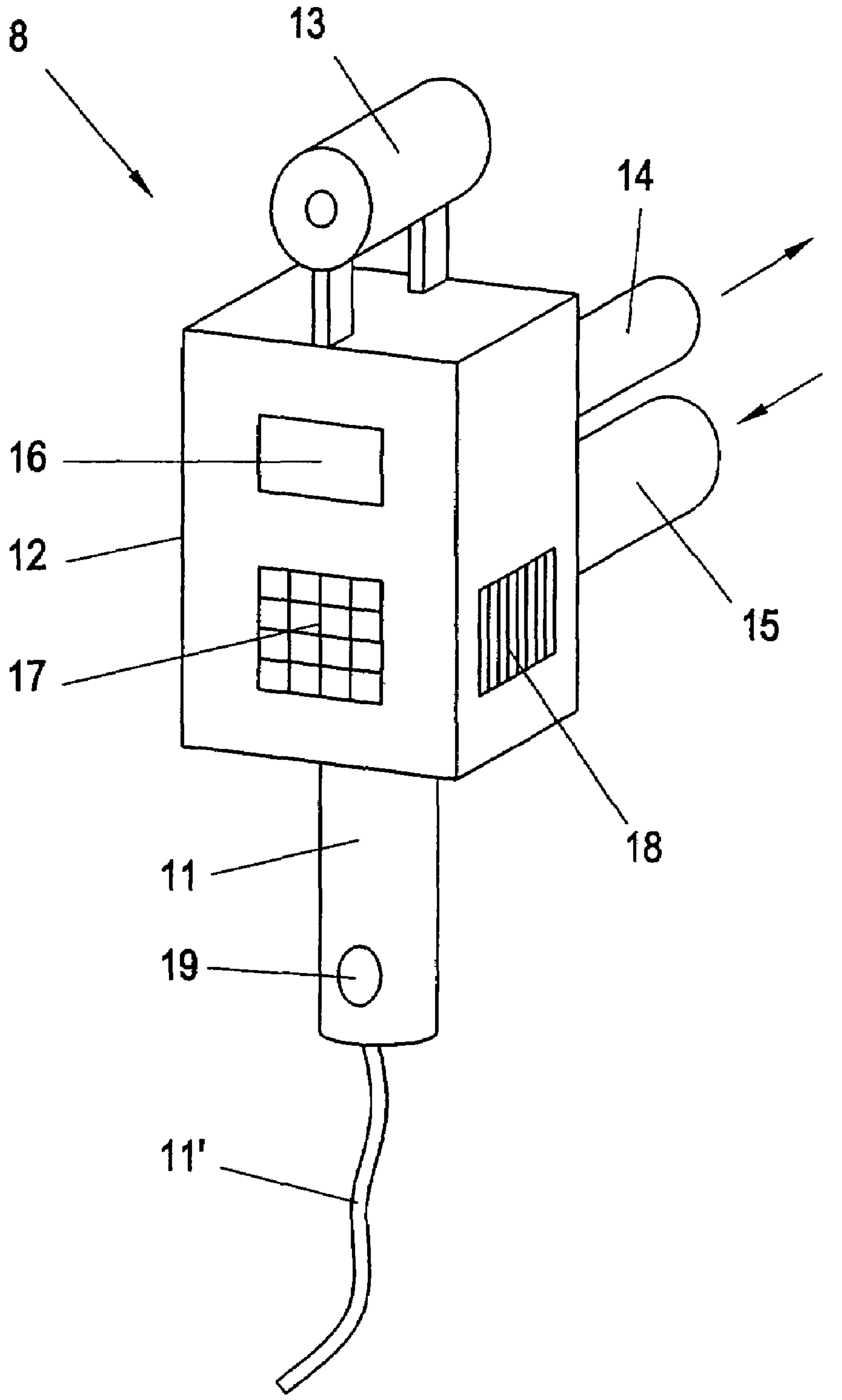
Figure 3:
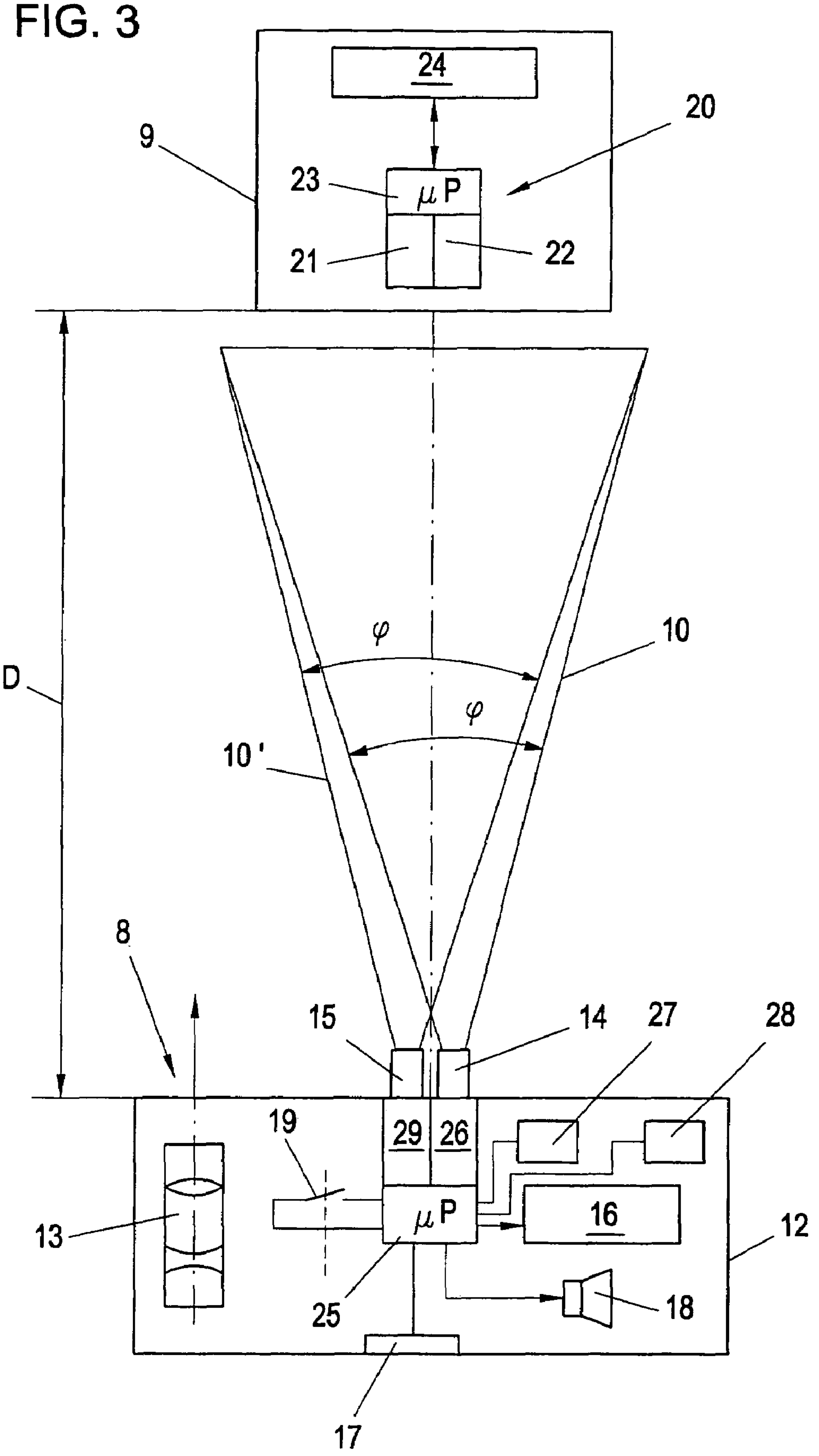
Figure 4:
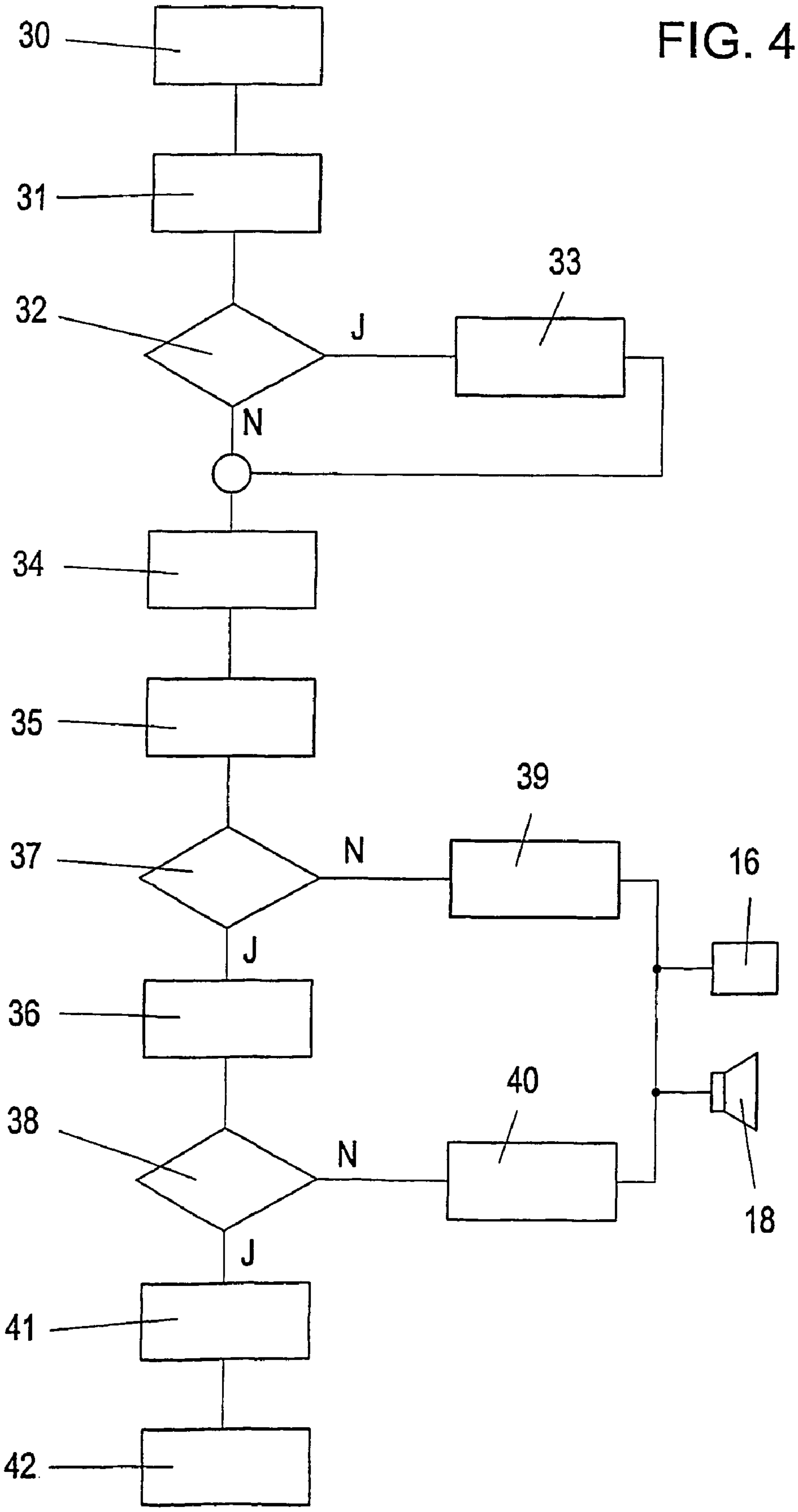

The invention will now be explained in more detail by way of preferred exemplary embodiments illustrated in the drawings to which, however, it shall not be restricted. In detail, FIG. 1 shows a schematic top view onto a part of the roadway comprising three lanes, with vehicles and with a mobile communication device according to the present invention;

FIG. 2 shows, in a perspective view, a communication device according to the present invention, in the form of a portable device;

FIG. 3 schematically shows—partly as a block diagram—an inventive communication device in combination with a vehicle-borne communication unit communicating therewith; and FIG. 4 shows a flow chart to illustrate the procedure during a data exchange in the course of a selective communication between the present communication device and a vehicle-borne communication unit.

In FIG. 1, a roadway 1 comprising three lanes 2, 3, 4 is schematically illustrated, on which there are vehicles 5, 6 and 7. At the border of the roadway 1, a mobile wireless communication device 8 is shown which selectively communicates with a vehicle-borne communication unit 9 in one of the vehicles, e.g. in vehicle 5; this is schematically indicated in FIG. 1 by a narrow, focused infrared beam 10.

The distance D between the mobile communication device 8 and the vehicle 5 is, e.g., approximately 100 m, the radiation characteristic (cf. the narrow beam 10) of the communication device 8 is adapted to the selectivity with respect to the communication with vehicles at such a distance D, in accordance with the maximum defined range, i.e. the angle $\phi$ of the radiation and also of the receiving characteristic is accordingly small, e.g. in the order of 2°, generally, e.g., between 0.5° and 4° or 5°. In case of a range of 200 m, therefore, the beam 10 must be radiated with a correspondingly smaller radiation angle than in case of a range of 100 m or of merely 50 m, i.e. an even narrower directional characteristic must be provided for the transmitter and for the receiver of the communication device 8. Thereby it is achieved that selectively only the one desired vehicle, e.g. 5 in FIG. 1, is covered, whereas other vehicles, e.g. in the other lanes 3, 4, are not covered, so that an undisturbed data exchange can occur with the one, desired vehicle 5. Such a data exchange is, e.g., desired in the course of a check as to whether or not the vehicle 5 has carried out a toll transaction for paying a prescribed toll when previously passing a toll site. Accordingly, the vehicle-borne communication unit 9 must be activated (woken up) by the communication device 8 and caused to deliver an identification as well as to transmit the desired information regarding previous toll transactions. This procedure will be explained in more detail herebelow, in particular by way of FIGS. 3 and 4.

In FIG. 2, a mobile wireless communication device 8 designed as a portable hand tool is shown, wherein a housing 12 comparable to that in so-called laser guns is attached on a handle 11 through which electric connection lines 11' (for energy supply and, optionally, data transmission) extend. On the upper side of housing 12, an optic sighting unit. 13 is attached with which the desired vehicle, e.g. 5 (FIG. 1), can selectively be sighted so as to then deliver the transmission beam 10 (FIG. 1) via a transmitter not further illustrated in FIG. 2 and a focusing optics 14. To receive wave beams transmitted back from the respective vehicle-borne communication unit 9, a comparable optics 15 with a narrow receiving angle is provided which is mounted before the receiver proper in the interior of housing 12.

On the rear side of the hand unit facing the operator (not illustrated), an LCD display 16 is provided as an optic indication unit; furthermore, an input keyboard 17 is provided on this rear side of the unit, below the LCD display 16, so as to be able to supply corresponding input data to the control unit contained in housing 12 and in particular designed with a microprocessor.

Laterally on housing 12, in the exemplary embodiment illustrated, there is a buzzer-loudspeaker 18 so as to deliver certain predetermined buzzing sounds as an acoustic indication, depending on whether or not a communication with the vehicle has been achieved.

Furthermore, the communication device 8 is provided with a trigger-like switch 19 so as to trigger the transmitter, i.e. to cause it to radiate electromagnetic waves. This switch 19 may be located at any desired suitable site on the housing 12, or it may be preferably provided on the handle 11 so as to allow for an actuation by means of the thumb, e.g., in a comfortable manner.

In FIG. 3, the present mobile wireless communication device is shown at 8 and a vehicle-borne communication unit is shown at 9 at a distance D which, as shown, is not true to scale. The vehicle-borne communication unit 9 commonly is termed OBU unit (on-board unit), and it comprises a communication circuit 20 including a transmitter 21 and a receiver 22 as well as a microprocessor 23. The microprocessor 23 furthermore has an associated memory 24 in which all the various data relating to toll transactions as well as an identification number and the like are stored.

In the mobile communication unit 8, within housing 12, a microprocessor 25 connected to the switch 19 is provided as a control unit for a transmitter 26. Moreover, a memory 27 for data corresponding to the signals to be transmitted as well as a memory 28 for storing data received via a receiver 29 and processed by the microprocessor 25, acting a processing unit are connected to the microprocessor. In FIG. 3, furthermore, optics 14 and 15, respectively, for achieving the narrow directional characteristics 10, and 10', respectively, with an angle of aperture or receiving angle ϕ in the order of, e.g., 0.5° to 5°, in particular 0.8° to 2.5°, are schematically illustrated. The angle ϕ results from the maximum range provided, corresponding to the maximum distance D, wherein the diameter, i.e. the width dimension, of the delivered ray beam 10 at the site of the vehicle should be approximately one lane width, i.e., e.g., about 3 m, at the most. In this manner, the desired selectivity for covering one vehicle 5 only in the region of the maximum range (which may be 100 m or also 200 m), is ensured, i.e. a coverage of undesired vehicles which are in other lanes or in the same lane in front of or behind the chosen vehicles is prevented. It maybe mentioned here that in case parking vehicles are checked, also smaller ranges, e.g. 20 m or 50 m, may suffice, in which case also the angle ϕ may accordingly be larger.

Furthermore, in FIG. 3 the LCD display 16 as well as the loudspeaker 18 are schematically illustrated. In case of an inquiry from an OBU 9, the communication device 8—via the sighting unit 13—is directed towards the vehicle to be checked, in which or on which the OBU 9 to be interrogated is mounted, e.g. towards vehicle 5 in FIG. 1. When pressing the trigger-like switch 19, the transmitter 26 is activated so that it brings the OBU 9 in vehicle 5 from the standby state into the active state by means of a wake-up command. In its ready state, OBU 9 now is capable of transmitting back appropriate data to the communication device 8 in response to inquiry commands transmitted from transmitter 26, such as, e.g., "answering-status" or "read out last transaction", it being ensured in the course of this communication that selectively only data from the sighted OBU 9 will be received. At least parts of the received data, or processed data, respectively, will be displayed on the LCD display 16, and the result of the data communication ("correct", "incorrect", "no data") will also be acoustically signaled via loudspeaker 18 by delivering different buzzing sounds.

Vehicle-borne communication units (OBUs) 9 from other vehicles will not be activated in this selective communication; in case other OBUs 9 were transmitting, they will not be noticed, or will be blocked, due to the narrow receiving characteristic of the communication device 8, cf. directional characteristic 10' in FIG. 3. In this respect, primarily the receiving characteristic must be defined to be narrow, with the transmitting characteristic theoretically also possibly being adapted to be less narrow—if also the OBUs of other vehicles are "woken up" by the transmitter 26, the receiver 29 will not receive their signals. Vice versa, it is also conceivable to design only the transmitter 26 with a narrow radiation characteristic, if other vehicle OBUs cannot transmit and only the desired OBU 9 is "woken up" so that it will be ensured that only signals from the one desired OBU 9 are received even if receiver 29 has a wider receiving characteristic. Preferably, however, both the transmitter 26 and also the receiver 29 have the indicated narrow directional characteristic for the desired selectivity.

OBU 9 which is respectively in or on vehicle 5 (or 6, 7, respectively) is equipped in a conventional manner, e.g. with a close range communication device 20, i.e. a so-called DSRC communication device, and in memory 24 the respective relevant data that can be interrogated by communication device 8 are stored. These data may, e.g., relate to the last twenty toll transactions, or they may also relate to a parking permit, an electronic license etc. If OBU 9 receives an interrogation command (communication command) from communication device 8, it will answer in accordance with the interrogation command by delivering the desired data via the close-range communication unit 20. The transmission-receiving characteristic of OBU 9 in this case is not adapted to be just as narrow which, however, is sufficient for the present use since the receiving characteristic 10' of the mobile communication device 8 is accordingly narrow so that data can only be received from the sighted OBU 9.

In FIG. 3, also the keyboard 17 for entering data, particularly identifying data relating to the next toll site for storing them in memory 27, is indicated, the keyboard 17 being connected to the microprocessor 25.

Transmitter 26 and receiver 29 may be designed in a per se conventional manner which is not explained in detail here, e.g. as an infrared transmitter and an infrared receiver, respectively, having the desired optic elements (IR diode and photosensitive diode, as well as associated electronics for a pulsed mode of operation).

From FIG. 4, the sequence during an inquire for checking an OBU 9 in a vehicle 5 can be seen, wherein after turning on the communication device 8 (cf. block 30 in FIG. 4) and a ready-indication on display 16 according to block 31 it is inquired, cf. field 32 in FIG. 4, whether adjustments such as relating to the date and time or relating to the toll site identification are desired. If so, an appropriate data input will be effected according to block 33, via keyboard 17, and the device then is in a waiting position which is also achieved if no adjustments are desired.

If a vehicle is sighted and a selective communication is desired with the OBU 9 thereof, triggering of the transmitter 26 of the communication device 8 is effected by actuating the switch 19, as illustrated in FIG. 4 at 34. Accordingly, wake-up signals and inquiry signals are sent to OBU 9 according to blocks 35 and 36, respectively, in FIG. 4, and subsequently it is each inquired whether or not an answer, such as the OBU identification (cf. field 37) or the desired data (cf. field 38) have been received. If not, one error indication each is triggered, cf. blocks 39 and 40, these error indications being acoustic, by different buzzing signals, which are delivered via the loudspeaker 18. In parallel thereto, an optic indication is caused via the LCD indicating unit 16.

When the OBU identification has been effected and the desired data have been received, the latter are stored according to block 41, and optionally are printed out via a printer not further illustrated, and the procedure finally is confirmed to have duly been terminated according to block 42.

The invention claimed is:

1. A wireless infrared toll checking system for communicating with IR communication units in vehicles, for wireless checking as to whether or not a toll transaction has occurred, said toll checking system comprising:

a) an active vehicle communication unit disposed in a motor vehicle;

b) a portable toll checking device comprising:

i) a portable housing ii) an IR-transmitter disposed in said housing and comprising an IR diode, for sending an IR signal to said active vehicle communication unit, iii) an IR-receiver disposed in said housing and for receiving information containing electromagnetic waves from said active vehicle communication unit;

iv) at least one focusing optic, disposed in said housing and for focusing said transmitted IR signal;

v) at least one receiving optic disposed adjacent to said at least one focusing optic in said housing, and for receiving a signal transmitted from said active vehicle communication unit within a limited receiving angle range;

vi) a control unit disposed in said housing for controlling said IR-transmitter, wherein said IR-receiver and said IR-transmitter have optics with a directional characteristic, said directional characteristic being adaptable in accordance with a given maximum distance to IR communication units in vehicles, for a selective communication with said active vehicle communication units at distances (D) of from 20 m to 200 m,;

vii) an optic sighting unit coupled to said housing;

viii) a processing unit disposed in said housing;

ix) an indication unit disposed in said housing the indication unit being connected to said IR-receiver via said processing unit;

wherein said control unit for said IR transmitter has an associated memory for, pre-determined transmission signal information, and wherein said IR transmitter sends a wake up signal to wake up said active vehicle communication unit wherein said wake up signal includes command signals for said vehicle communication unit, and is arranged so to cause said active vehicle communication unit to identify itself and send stored status information, and information regarding toll transactions, in an automatic manner.

2. The communication system according to claim 1, wherein the directional characteristic is defined for a selective communication at distances in the order of approximately 100 m.

3. The communication system according to claim 1, wherein said IR-receiver is provided with a receiving angle of from 0.5° to 5°.

4. The communication system according to claim 3, wherein the receiving angle is from 0.8° to 2.5°.

5. The communication system according to claim 1, wherein said IR-transmitter is provided with an angle of radiation of from 0.5° to 5°.

6. The communication system according to claim 5, wherein said angle of radiation is from 0.8° to 2.5°.

7. The communication system according to claim 1, wherein said indication unit comprises a LCD display.

8. The communication system according to claim 1, wherein the indication unit comprises an acoustic indicating means, e.g. a buzzer.

9. The communication system according to claim 1, wherein said processing unit is formed by a processor.

10. The communication system according to claim 9, wherein said processor has a memory for information to be transmitted and received, respectively.

11. The communication device according to claim 9, wherein said processor has a clock signal generator for providing a date and clock indication.

12. The communication system according to claim 1, wherein said control unit for said transmitter is formed by a processor.

13. The communication system according to claim 12, wherein said processor is connected to an input unit, in particular keys, for inputting information and instructions.

14. The communication system according to claim 1, wherein said control unit for said IR-transmitter has an associated trigger-like switch for triggering the transmitter for radiating electromagnetic waves.

15. The communication system according to claim 1, wherein said control unit for the said IR-transmitter, has an associated memory for pre-determined transmission signal information, with a wake-up signal for said vehicle communication unit and with command signals for said vehicle communication unit so as to cause said vehicle communication unit to identify itself and deliver stored information, in particular status information and information regarding toll transactions.

16. The communication device according to claim 1, further comprising a memory for storing a toll-site identification.

17. A portable wireless infrared toll checking device for communicating with active communication units in vehicles for wireless checking as to whether a toll transaction has occurred, said toll checking device comprising:

a) a portable housing;

b) an IR transmitter disposed in said housing and having focusing optics arranged for selective communication with the communication units in the vehicles at a distance of at least 20 meters to 200 meters;

c) an IR receiver disposed in said housing said IR receiver having receiving optics disposed adjacent to said focusing optics, said receiving optics for receiving and reading signals within a limited receiving angle range;

d) a control unit disposed in said housing and for controlling said IR transmitter, said control unit having a memory for storing predetermined transmission signal information comprising a wake up signal to be sent to the vehicle communication unit, and wherein said control unit has an additional memory for storing toll site identification information;

e) an optical sighting unit coupled to said housing and for allowing a user to aim said IR transmitter;

f) at least one indication unit disposed in said housing and being coupled to said IR receiver;

g) a memory unit;

wherein said IR transmitter sends command signals to the vehicle communication unit to cause the vehicle communication unit to identify itself and deliver stored information in the form of status information regarding toll transactions wherein said status information regarding toll transactions are stored in said memory unit; and wherein the control unit for the IR transmitter has an associated memory for pre-determined transmission signal information, with a wake up signal for the vehicle communication unit.

18. The portable wireless device as in claim 17, further comprising a handle coupled to said housing, wherein said handle is for allowing a user to hold the device and point the device at a particular vehicle while using said optical sighting unit.

19. The portable wireless device as in claim 18, further comprising a trigger switch coupled to said housing, said trigger switch to trigger said IR transmitter.

20. The portable wireless device as in claim 17, wherein said IR transmitter has a narrow directional characteristic corresponding to an angle between 0.5 degrees to 4 degrees.

21. A system for tracking motor vehicles and for charging tolls comprising:

a) at least one active communication unit on an associated motor vehicle, said at least one communication unit have a microprocessor having an associated memory for storing data relating to toll transactions;

b) a portable wireless infrared communication device comprising:

i) a portable housing;

ii) an IR transmitter disposed in said housing and having focusing optics arranged for selective communication with said at least one communication unit in said associated vehicle at a distance of at least 20 meters to 200 meters;

iii) an IR receiver disposed in said housing;

iv) at least one focusing optic disposed in said housing, for focusing said transmitted IR signal;

v) at least one receiving optic, disposed adjacent to said focusing optic in said housing, said at least one receiving optic for receiving information from said active vehicle communication unit within a limited receiving angle range;

vi) a control unit disposed in said housing and for controlling said IR transmitter, said control unit having a memory for storing predetermined transmission signal information comprising a wake up signal to be sent to the vehicle communication unit, and wherein said control unit has an additional memory for storing toll site identification;

vii) an optical sighting unit coupled to said housing and for allowing a user to aim said IR transmitter; and viii) at least one indication unit disposed in said housing and being coupled to said IR receiver;

wherein said IR transmitter sends command signals to said at least one active vehicle communication unit to cause said at least one active vehicle communication unit to identify itself and deliver stored information in the form of status information regarding toll transactions and wherein the control unit for the IR transmitter has an associated memory for pre-determined transmission signal information, with a wake up signal for activating said active vehicle communication unit so that said active vehicle communication unit can transmit signals back to said portable wireless infrared communication device.

22. A system for tracking motor vehicles as in claim 21, wherein said at least one active communication unit further comprises a communication unit comprising a transmitter and a receiver.

23. The system for tracking motor vehicles as in claim 22, wherein said at least one active communication unit further comprises a microprocessor, and a memory, said memory for storing data relating to toll transactions and identity information.

24. The system for tracking motor vehicles as in claim 21, wherein said control unit has a series of instructions for performing the following steps:

a) initiating in said portable wireless infrared communication device a wake up signal via an infrared transmission from said IR transmitter to said active communication unit to selectively wake up said active communication unit; and b) receiving and storing information derived from a plurality of signals transmitted from said active communication unit, said information relating to toll transactions and identification information.

* * * * *